(12) United States Patent
Gentili

(10) Patent No.: US 9,920,289 B2
(45) Date of Patent: Mar. 20, 2018

(54) METHOD AND APPARATUS FOR PROCESSING VEGETABLE PRODUCTS

(76) Inventor: Paolo Gentili, Trento (IT)

( * ) Notice: Subject to any disclaimer, the term of this patent is extended or adjusted under 35 U.S.C. 154(b) by 2240 days.

(21) Appl. No.: 11/884,198

(22) PCT Filed: Nov. 18, 2005

(86) PCT No.: PCT/IB2005/003450
§ 371 (c)(1),
(2), (4) Date: Nov. 5, 2007

(87) PCT Pub. No.: WO2006/087601
PCT Pub. Date: Aug. 24, 2006

(65) Prior Publication Data
US 2008/0145478 A1    Jun. 19, 2008

(30) Foreign Application Priority Data

Feb. 18, 2005 (IT) .............................. MO2005A0042

(51) Int. Cl.
C12G 1/022    (2006.01)
C12L 9/00     (2006.01)
C12G 1/02     (2006.01)

(52) U.S. Cl.
CPC . *C12L 9/00* (2013.01); *C12G 1/02* (2013.01)

(58) Field of Classification Search
CPC .................................. C12G 1/02; C12L 9/00
USPC ...... 426/15, 467; 99/276, 277, 277.1, 277.2, 99/278
See application file for complete search history.

(56) References Cited

U.S. PATENT DOCUMENTS

| 3,507,208 A | 4/1970 | Lee |
| 4,021,579 A | 5/1977 | Barrett |
| 4,268,005 A | 5/1981 | Raftis et al. |
| 4,773,315 A * | 9/1988 | Enenkel ..................... 99/323.12 |

FOREIGN PATENT DOCUMENTS

| DE | 917 122 | 8/1954 |
| DE | 44 34 394 C1 | 6/1995 |
| DE | 195 17 937 | 11/1996 |
| DE | 198 37 201 | 2/1999 |

(Continued)

OTHER PUBLICATIONS

English translation of FR 2359205. ProQuest Dialog.*

(Continued)

*Primary Examiner* — Michele L Jacobson
*Assistant Examiner* — Ericson M Lachica
(74) *Attorney, Agent, or Firm* — Nixon & Vanderhye P.C.

(57) ABSTRACT

A method for processing, in a container, a vegetable product containing a solid part suspended in a liquid part, comprises controlling the pressure of a gas in said container for modifying the specific weight of said solid part, so as to prevent said solid part from floating on said liquid part until drying; an apparatus comprises a timing device arranged for opening and/or closing, in a cyclical manner, a venting arrangement comprised in an operating chamber of a vinifying apparatus, so as to alternatively make said operating chamber communicate with an external environment and/or separate said operating chamber from said external environment and consequently decrease and/or increase a pressure of a gas in said operating chamber.

15 Claims, 4 Drawing Sheets

(56) References Cited

FOREIGN PATENT DOCUMENTS

| DE | 101 03 002 | 8/2002 |
|---|---|---|
| EP | 0 530 820 | 3/1993 |
| EP | 0 737 740 | 10/1996 |
| EP | 1 028 162 | 8/2000 |
| EP | 1 229 108 | 8/2002 |
| EP | 1 314 778 | 5/2003 |
| FR | 2 082 572 | 12/1971 |
| FR | 2 359 205 | 2/1978 |
| JP | 10323175 A | 12/1998 |
| SU | 798167 | 1/1981 |
| WO | WO 98/45403 | 10/1998 |
| WO | WO 02/059249 A1 | 8/2002 |

OTHER PUBLICATIONS

English translation of FR 2082572. ProQuest Dialog.*
English Translation of EP05030820 from EPO.*
Armenian Office Action (and English translation) in Armenian App. AM20070098 dated Nov. 12, 2007.
Translation into English of Paragraph 2.5.2.2._ Technologie des Weines by G. Troost, $5^{th}$ Edition, Verlag Eugen Ulmer, Stuttgart, Germany.
International Search Report dated Jun. 13, 2006.
Notice of Opposition for corresponding European Patent No. 1805294 B1, issued Jun. 18, 2008 (8 pages).
Relevance of documents (in non-English language) cited in the grounds of opposition against EP 1805294 B1, (2 pages).
Rieger Behälterbau GmbH, VineTop-Fermentor VinoStat-Vollontsattor Agitating Tanks, Received at the EPO on Mar. 13, 2009 (8 pages).
Signed Declaration of Expert Aenologist Girolamo Michelin (D5) (2 pages).
Di Pietro De Vita, "Corso di meccanica enological", Edition 3, Published by Hoepli Editore, 2004, p. 58 (1 page).
Di Pietro De Vita, "Corso di meccanica enological", Edition 3, Published by Hoepli Editore, 2004, p. 95-96 (2 pages).

* cited by examiner

METHOD AND APPARATUS FOR PROCESSING VEGETABLE PRODUCTS

This application is a continuation of PCT International Application No. PCT/IB2005/003450 filed on Nov. 18, 2005. PCT/IB2005/003450 claims priority to IT Application No. MO2005A000042 filed on Feb. 18, 2005. The entire contents of these applications are incorporated herein by reference.

BACKGROUND OF THE INVENTION

The invention relates to a method for processing vegetable products, in particular in vinification, and to an apparatus for implementing the above-mentioned method, with which apparatus known types of apparatuses can be equipped. According to the prior oenological art, vinification is conducted in special fermentation vessels, called fermentation vats, into which a mixture is inserted comprising grape must, crushed grapes and marc (skins and grape seeds). During fermentation, the must produces considerable volumes of carbon dioxide (about 0.5 hectolitres of gas per hour per hectolitre of must). The carbon dioxide produced pushes upwards the whole grapes and the crushed grapes, which form the so-called "cap" floating on the must contained in the fermentation vat. The cap tends to solidify, substantially preventing the solid parts that form the cap from remaining in contact with the must and releasing useful substances in the latter, such as anthocyanins (polyphenols), aromas and tannins contained in the grapes and responsible for the colour, flavour and bouquet of the wine. In order to overcome this drawback, the cap is periodically irrigated with a certain quantity of must taken from the base of the fermentation vat. For this purpose, it is necessary to provide the fermentation vat with an irrigating apparatus, which is substantially complex inasmuch as it comprises a pump for removing the must, one or more pipes for conveying the removed must to the top of the fermentation vat and an irrigating device placed inside the latter.

The must by means of which the cap is irrigated does not succeed actually in completely soaking the latter, because in the cap preferential outflow conduits are formed along which the must flows. The grape berries are gradually filled with the gas produced by the fermentation and consequently form a floating mass that becomes progressively more and more solid. The must can consequently wet only the zones of the cap that are near to the preferential outflow conduits, namely about 30% of the cap.

In order to overcome this drawback and wet the cap more effectively, breaking up and sinking the latter in the must by using mechanical apparatuses, for example pistons, is known. However, these apparatuses, in addition to being substantially complex and expensive, damage the grape berries and extract undesired substances from the skins of the latter.

Alternatively to the aforementioned mechanical apparatuses, vinification methods are known in which the carbon dioxide produced by fermentation is accumulated in the vinifying apparatus until high pressure is produced in the latter. The gas is then violently released outside, in order to break up the cap that has formed during fermentation. This method has the drawback of damaging the grape berries during the sudden expulsion of the gas and requires the use of autoclaves, namely sealed tanks able to withstand pressure above 0.5 bar.

Vinification methods are furthermore known in which the carbon dioxide produced by fermentation is accumulated in gaps made in the wall of the vinifying apparatus. The gas that is thus accumulated is then released more or less violently into the liquid must underneath the cap, so as to break up the latter. Also this system has the drawback of substantially damaging the grape berries.

Furthermore, in known vinifying apparatuses spring valves are used having the function of pressure-regulating valves. A drawback of this type of valve consists of the fact that the spring may jam, thus making the valve insufficiently reliable.

SUMMARY OF THE INVENTION

An object of the invention is to improve known vinifying methods and apparatuses.

Another object is to provide a vinifying method and apparatus that enables forming of the cap to be prevented, thus eliminating the need to use the complex apparatuses provided for irrigating and/or breaking up and sinking the cap.

A further object is to provide a vinifying method and apparatus in which the pressure of the gas produced by fermentation is kept below 0.4 bar, so as to avoid the use of autoclaves.

A further other object is to provide a vinifying method and apparatus that enables useful substances contained in the grape berries to be extracted from the latter and in which the process parameters can be varied in relation to the type of grapes processed and the desired degree of extraction.

Another further object is to simplify known vinifying apparatuses, reducing the moving mechanical parts in the latter so as to also reduce production and maintenance times and costs.

Still a further object is to provide a pressure-regulating device that is associable with known vinifying apparatuses and such as to be, in use, more efficient and safer than known spring valves.

In a first aspect of the invention, there is provided a method for processing, in a container, a vegetable product containing a solid part suspended in a liquid part, comprising controlling a pressure of a gas in said container for modifying the specific weight of said solid part, so as to prevent said solid part from floating on said liquid part until drying.

In a second aspect of the invention, an apparatus is provided comprising a timing device arranged for opening and/or closing, in a cyclical manner, a venting arrangement comprised in an operating chamber of a vinifying apparatus, so as to alternatively make said operating chamber communicate with an external environment and/or separate said operating chamber from said external environment and consequently decrease and/or increase a pressure of a gas in said operating chamber.

Owing to these aspects, a vinifying method is available during which the formation of the cap is substantially prevented, inasmuch as the solid component of the vegetable product (crushed and whole grape berries), which solid component is repeatedly immersed in the must and is then made to reemerge from the latter, cannot give rise to a compact and thus hardly wettable layer. This enables, at the same time, the complex apparatuses to be avoided that are usually provided for irrigating and breaking up the cap and the solid component to be effectively wet, thus enabling useful substances such a polyphenols, anthocyanins, flavours and tannin to be extracted in an optimal manner from the solid component.

In this way, the number of components, in particular moving parts, which are required in a vinifying apparatus is significantly reduced, and the need to provide in the latter fixed partitions or walls having a great thickness is also avoided. This makes the structure of the vinifying apparatus substantially simpler, and consequently, it enables the time and costs to be reduced that are required to build the vinifying apparatus and keep the latter efficient.

Furthermore, a vinifying apparatus provided with a simple structure can easily be subjected to cleaning operations and be used in an optimal manner as a storage tank, when fermentation has been completed.

The apparatus provided with a timing device enables an operator to alternate over time in a preset manner pressure variations inside the vinifying apparatus, and therefore to alternate over time in a preset manner the immersing and reemerging of the solid component. In this way it is possible, for example, to program various pressure variation cycles depending on the quality of the grapes used for vinification.

In an embodiment, the timing device opens and/or closes a door element comprised in the vinifying apparatus.

In another embodiment, the timing means device opens and/or closes a pressure-limiting valve device comprised in the vinifying apparatus.

In a third aspect of the invention, a valve device for vinifying apparatus is provided, comprising: a casing arrangement defining a transit cavity, a sleeve member contained in said transit cavity, a gap interposed between said casing arrangement and said sleeve member, said sleeve member being arranged for closing said transit cavity through the effect of a pressure produced by an operating gas that is contained, in use, in said gap, a supplying conduit leading into said gap and arranged for supplying said operating gas, wherein said supplying conduit comprises a transit limiting device shaped in such a way as to prevent said operating gas from flowing out from said gap.

Owing to this aspect, a valve is available that is associable with a known vinifying apparatus and is usable for adjusting the pressure of the gas produced inside the vinifying apparatus during fermentation. This valve operates in a substantially efficient and safe manner, inasmuch as it is driven by a gas, for example compressed air dispensed by a distribution line of known type, rather than being driven by a spring that may accidentally jam. Furthermore, the transit limiting device provided by the invention prevents the gas, once it has been delivered into the gap, from escaping from the latter, and this enables the pressure produced by the gas to be kept constant on the sleeve member. In this way, any drawbacks that may occur in the distribution line of the compressed air such as, for example, pressure falls, cannot interfere with valve operation.

BRIEF DESCRIPTION OF DRAWINGS

The invention can be better understood and implemented with reference to the attached drawings that show an exemplifying but non-limitative embodiment thereof, in which.

DETAILED DESCRIPTION

Figure 1:
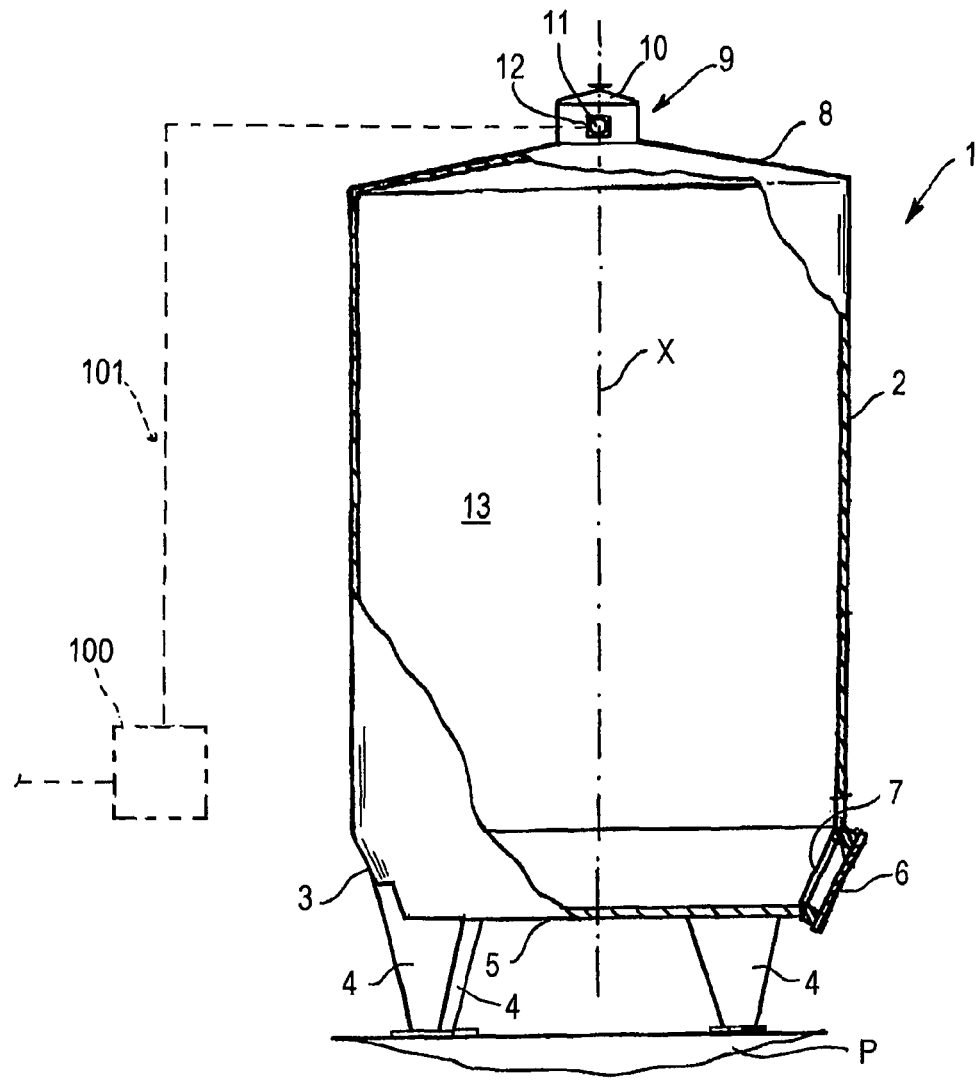
FIG. 1 is a partially sectioned, fragmentary and incomplete longitudinal view of a vinifying apparatus.

With reference to FIG. 1, a vinifying apparatus 1 comprises a hollow cylindrical body 2, which has a longitudinal axis X vertically arranged in relation to a floor portion P and rests on the latter by means of a plurality of supporting elements 4 extending longitudinally. From the body 2 a hollow bottom 3 originates, which is substantially cone-shaped and has a truncated top 5 facing the floor portion P. In a side portion of the bottom 3 a first door 6 of known type is comprised, by means of which an outlet 7 can be opened or closed, which outlet 7 is arranged for enabling the apparatus 1 to be emptied. The body 3 is closed above by a frustum-conical vault 8, from the centre of which a hatch 9 protrudes vertically. The hatch 9 is hollow cylinder-shaped and has a longitudinal axis, that is not shown, aligned on the longitudinal axis X of the body 2, and it can be alternatively opened or shut hermetically by means of a second door 10 of known type. The body 2, the vault 8 and the bottom 3 define, altogether, an operating chamber 13. A sleeve valve 12 is comprised in a connector 11, emerging from a side portion of the hatch 9.

Figure 10:
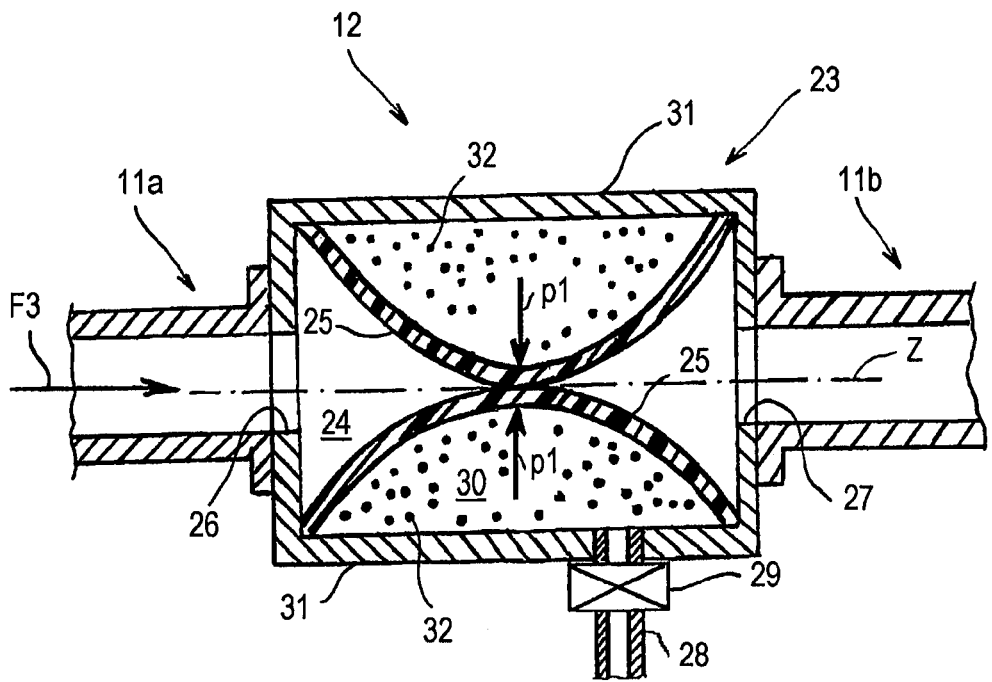
FIG. 10 is a schematic longitudinal section of a device comprised in the apparatus in FIG. 1.

With reference to FIG. 10, the sleeve valve 12, of known type, comprises a cylindrical casing 23, a side wall 31 of which defines a transit cavity 24 in which a cylindrical sleeve 25 is housed that is made of an elastically deformable material. The sleeve 25 is fixed internally to the transit cavity 24 by means of a pair of end flanges, that are not shown, and is coaxial in relation to the casing 23. In the transit cavity 24, between the side wall 31 and the sleeve 25 a gap 30 is defined into which, in use, an operating fluid 32 (shown by means of dots) is delivered through a supplying conduit 28 provided with a non-return valve 29, positioned upstream of the casing 23.

The transit cavity 24 is interposed between an inlet portion 11a, coming from the operating chamber 13, and an outlet portion 11b and communicates with the latter respectively through an inlet hole 26 and an outlet hole 27, obtained in opposite end portions of the casing 23.

When the operating fluid 32 is delivered into the gap 30 at a preset pressure p1, the latter acts outside the sleeve 25, which retracts near to a longitudinal axis Z of the casing 23 until it is throttled, thus closing the transit cavity 24. In this closed configuration, the valve 12 cannot be traversed by any fluid coming in a direction F3 from the inlet portion 11a.

When the apparatus 1 is used to conduct fermentation of vegetable matter, as will be disclosed in detail below, the closed configuration of the sleeve valve 12 prevents a gaseous fluid produced during fermentation from escaping from the operating chamber 13 until the gaseous fluid produces a pressure higher than the pressure p1. At this point, the pressure of the gaseous fluid coming from the inlet portion 11a acts inside the transit cavity 24 dilating the sleeve 25 until the transit cavity 24 is again made accessible, thus enabling the gaseous fluid to traverse the transit cavity 24 and escape from the apparatus 1 through the outlet portion 11b.

In an embodiment (shown in the aforementioned FIG. 1), the sleeve valve 12 is supplied by a supplying circuit 101 (shown by a broken line) devoid of the non-return valve 29 and controlled by a timer 100 of known type (shown by a broken line). The timer 100 can be programmed so as to open the sleeve valve 12 at preset intervals of time during fermentation.

Figure 2:
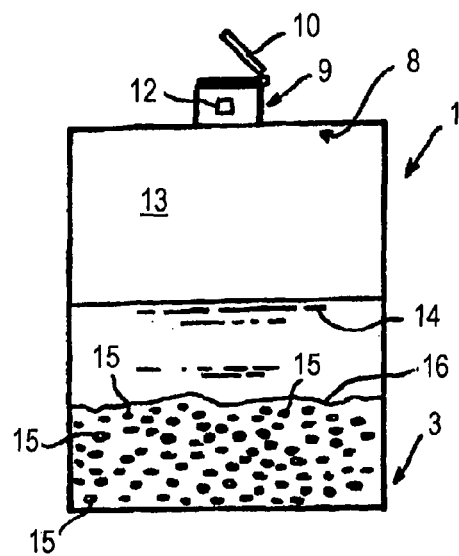
FIG. 2 is a schematic longitudinal section of the vinifying apparatus in FIG. 1, shown in an operating step.
Figure 6:
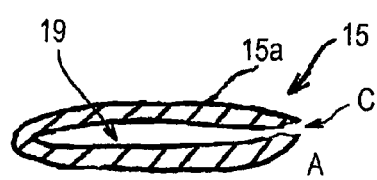
FIG. 6 is a schematic longitudinal section showing a shape adopted by a grape berry during fermentation conducted in the apparatus in FIG. 1.

With reference to FIGS. 2 and 6, the operating chamber 13 of the vinifying apparatus 1, schematically shown as rectangle-shaped, is loaded with a mixture to be fermented, comprising a liquid part, i.e. the must 14, and a solid part, formed of crushed grape berries 15 and marcs (skins and grape seeds) 16, the latter shown globally and schematically as an area with an irregular outline. Before fermentation starts, the marcs 16 and the crushed grape berries 15, as they are provided with a specific weight that is greater than that of the must 14, lie near to the bottom 3 of the apparatus 1. As shown schematically in FIG. 6, through the effect of the pressing that it has previously undergone, each grape berry 15, comprising a cavity 19 delimited by a casing or skin 15a, has adopted a flattened shape A. Furthermore, at least a portion of the skin 15a is interrupted so as to give origin to a transit slit C that makes the cavity 19 communicate with the operating chamber 13 of the apparatus 1. This enables, as disclosed in detail below, the must 14 and/or the carbon dioxide to migrate from the cavity 19 to the operating chamber 13, and vice versa.

Figure 3:
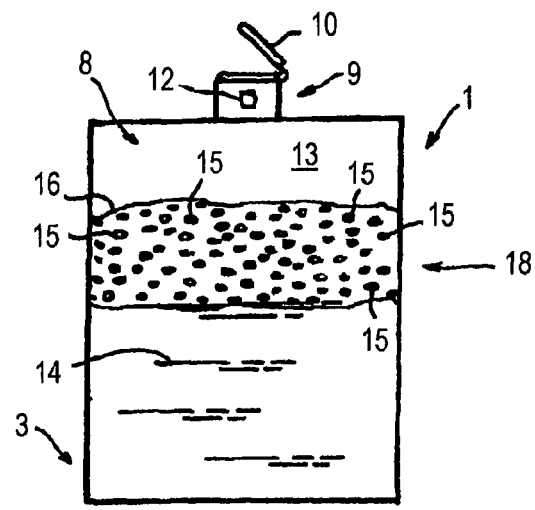
FIG. 3 is a section like the one in FIG. 2, showing the vinifying apparatus in another operating step.
Figure 7:
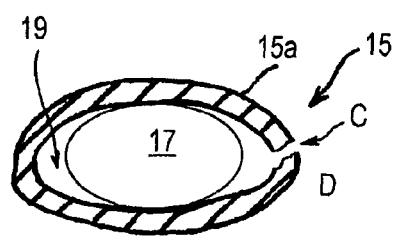
FIG. 7 is a section like the one in FIG. 6, showing a further shape adopted by the grape berry during fermentation conducted in the apparatus in FIG. 1.

With reference to FIGS. 3 and 7, compressed air, or oxygen, is delivered inside the operating chamber 13 through a device of known type that is not shown, in order to activate the yeasts, i.e. the microorganisms that are responsible for alcohol fermentation. As a result, the must 14 starts to ferment and to produce a significant volume of carbon dioxide. As shown in FIG. 7, in the cavity 19 of each grape berry 15 the carbon dioxide produced by fermentation forms some gas bubbles 17 (only one of which, for the sake of simplicity, is shown in FIG. 7) and the skin 15a swells, giving the grape berry 15 a dilated shape D. Owing to the gas bubbles 17 the specific weight of the grape berry 15 decreases, which grape berry 15 thus tends to rise inside the must 14 contained in the operating chamber 13. As this phenomenon is massive, all the grape berries 15 dilated by the gas produced therein are pushed upwards, i.e. in the direction of the vault 8 of the apparatus 1. The grape berries 15 drag the marcs 16 with themselves, forming a single mass 18 that tends to float on the free surface of the must 14. In this step, in the hatch 9, schematically shown as square-shaped, the door 10 is open and fermentation thus proceeds at atmospheric pressure.

Figure 4:
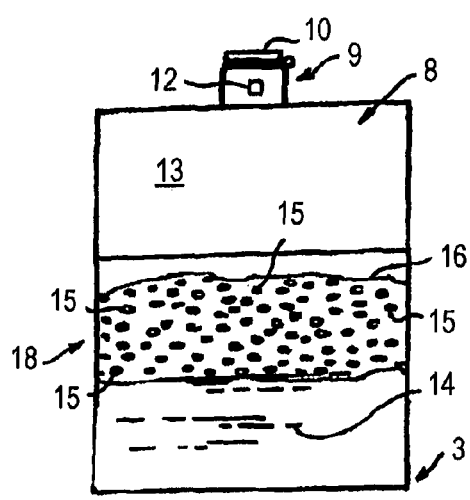
FIG. 4 is a section like the one in FIG. 2, showing the vinifying apparatus in a further operating step.

With reference to FIG. 4, when, through the effect of the carbon dioxide produced, the mass 18 floats on the free surface of the must 14, it is possible to hermetically close the operating chamber 13 by means of the second door 10. In this way, the carbon dioxide accumulates progressively in a portion of the operating chamber 13 interposed between the vault 8 and the free surface of the must 14. As the pressure of the carbon dioxide in the operating chamber increases, the gas bubbles 17 are partially expelled outside the grape berry 15 through the transit slit C and partially contract inside the cavity 19, so that also the grape berry 15 again adopts the flattened shape A. At the same time, the specific weight of the grape berries 15 increases, which grape berries 15 tend to descent altogether into the must 14, taking the marcs 16 with them. The mass 18, comprising the marcs 16 and the grape berries 15, is then immersed in the must 14 and wet by the latter.

Figure 5:
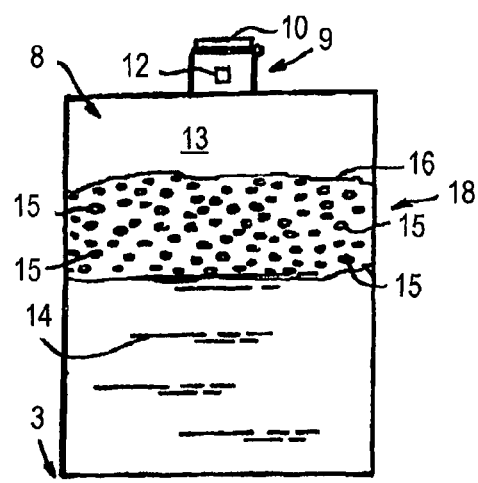
FIG. 5 is a section like the one in FIG. 2, showing the vinifying apparatus in another further operating step.

With reference to FIG. 5, when the pressure produced by the carbon dioxide accumulated in the operating chamber 13 reaches and exceeds a preset threshold value, which may, for example, be comprised between 0.3 and 0.4 bar, the sleeve valve 12 opens. The carbon dioxide then escapes from the apparatus 1 through the sleeve valve 12 and consequently in the operating chamber 13 the pressure decreases. As the action of the latter on the skin 15a of each grape berry 15 ceases, and as further carbon dioxide is produced in each cavity 19, each gas bubble 17 dilates again. Thus, the specific weight of the grape berries 15 again becomes less than that of the must 14, and the mass 18 again rises to the vault 8 of the apparatus 1.

Once the volume of carbon dioxide has been expelled outside that made pressure inside the apparatus 1 exceed 0.4 bar, the sleeve valve 12 closes again, and as fermentation proceeds, the carbon dioxide again starts to accumulate in the operating chamber 13.

When the apparatus 1 is provided with the embodiment of the sleeve valve 12 the supplying circuit 101 of which is controlled by the timer 100, it is possible to program a desired sequence of opening and closing of the valve 12, i.e. it is possible, respectively, to expel carbon dioxide from the operating chamber 13 and accumulate carbon dioxide in the operating chamber 13 at preset intervals, during fermentation.

In this way, it is possible to create an operating cycle of the apparatus 1 in which the time intervals are preset during which the grape berries 15 are immersed in the must 14 and/or rise to the surface of the latter.

This enables the fermentation method disclosed above to be implemented in a variable manner, depending on the quality of the grapes to be processed and on the type of wine to be produced.

In an embodiment that is not shown, the apparatus 1 is provided with several pressure-limiting valves, so as to increase safety during operation.

In another embodiment that is not shown, the apparatus 1 comprises both the sleeve valve 12 and other known types of pressure-limiting valves, for example spring valves.

In a further embodiment that is not shown, the second door 10 is provided with a pneumatic cylinder, which can be driven manually by an operator or be controlled in automatic manner, for example by means of a timer. In this way, when the pressure produced by the carbon dioxide reaches and exceeds the preset threshold value, it is possible to open the second door 10 by acting on the pneumatic cylinder, so as to enable the gas to escape from the apparatus 1 through the hatch 9.

This embodiment enables the apparatus 1 to operate in a substantially silent manner, inasmuch as, being the passage section of the hatch 9 significantly greater than the cross section of the transit cavity 24 of the sleeve valve 12, the whistle is avoided that is produced by the gas when the latter exits from the apparatus 1 through the sleeve valve 12, which whistle can be particularly irritating.

Within the apparatus 1 a cyclical process is thus established in which the gas produced by fermentation is periodically accumulated inside the operating chamber 13 and discharged outside the latter, with an accompanying immersion and reascent of the mass 18 in the must 14.

As a result, the mass 18 is completely and continuously wet by the must 14 and cannot give rise to a solid cap, and this result is obtained without having to resort to complex and costly irrigating and/or sinking devices.

A technical effect, which is associated with the aforementioned movement of the mass 18 in the operating chamber 13 and is surprisingly unexpected, consists of the fact that, in each grape berry 15, the periodic dilations and contractions which each grape berry 15 undergoes cause a sort of mechanical squeezing of the latter. In fact, when the gas bubbles 17 dilate, the residual liquid present in the cavity 19 of the grape berry 15 is expelled and combines with the fermenting must 14.

Figure 8:
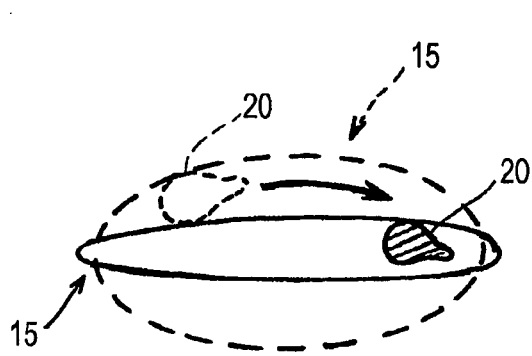
FIG. 8 is a schematic longitudinal section showing an effect that occurs inside the grape berry during fermentation conducted in the apparatus in FIG. 1.
Figure 9:
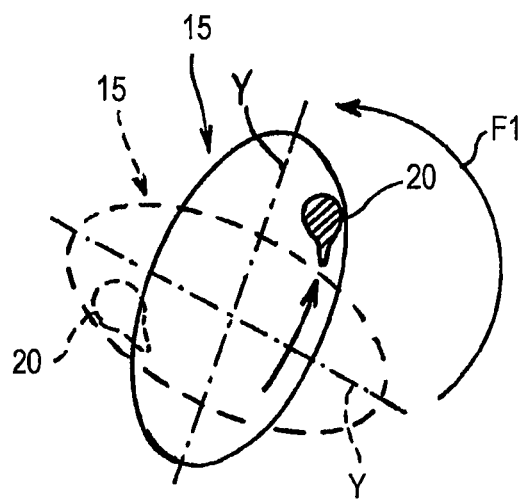
FIG. 9 is a section like the one in FIG. 8, showing a further effect that occurs inside the grape berry during fermentation conducted in the apparatus in FIG. 1.

With reference to FIGS. 8 and 9, the grape seeds 20 in the grape berry 15 can either be expelled together with the liquid or remain segregated inside the cavity 19. In the latter case, the grape seeds 20 are moved in a tumultuous manner inside the cavity 19, both through the effect of the aforementioned periodical dilations and contractions that occur in the grape berry 15 (FIG. 8) and because of rotating movements, like the one indicated by the arrow F1, performed by a longitudinal axis Y of the grape berry 15 (FIG. 9). As a result, each grape seed 20 tends to scrape the skin 15a internally and to remove from the latter useful substances such as polyphenols, which go into the must 14.

In this way, during fermentation conducted in the apparatus 1 according to the method disclosed hitherto, the polyphenols are extracted from the grapes in a manner that is substantially more effective than in known vinifying methods and apparatuses.

Figure 11:
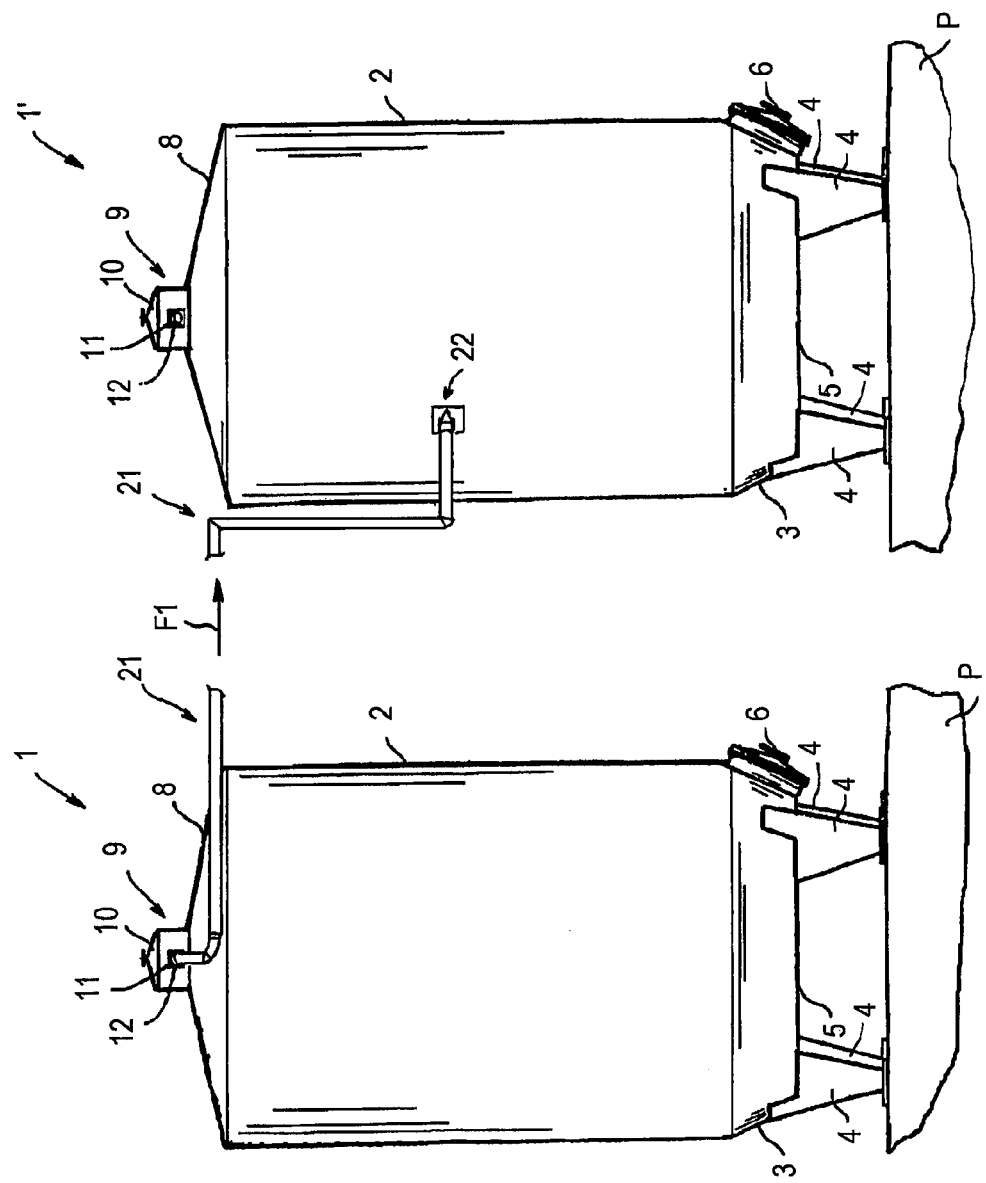
FIG. 11 is a fragmentary and incomplete frontal view, illustrating a pair of apparatuses like those of FIG. 1 that are functionally coupled together.

With reference to FIG. 11, it is possible to functionally couple a vinifying apparatus 1 and a further vinifying apparatus, indicated as 1' and structurally similar to the apparatus 1. This is obtained by means of a connecting conduit 21 interposed between the connector 11 of the apparatus 1 and an inlet opening 22 obtained in the further apparatus 1'. The carbon dioxide produced in the apparatus 1 during a fermentation process and which is expelled through the valve 12 is thus delivered to the connecting conduit 21 and, running along the latter in a direction indicated by the arrow F1, penetrates the further apparatus 1' through the inlet opening 22.

In this way, the carbon dioxide produced in the vinifying apparatus 1, instead of being dispersed in the environment, can be used to cause breaking up of the cap in the further vinifying apparatus 1'.

In an embodiment that is not shown, the further vinifying apparatus 1' can be replaced by a vinifying apparatus of known type.

In a further embodiment that is not shown, it is possible to serially couple a plurality of vinifying apparatuses, providing a plurality of connecting conduits and respective inlet openings in the latter.

The apparatus 1 disclosed hitherto can also be suitably used as a storage tank, once fermentation is complete.

The invention claimed is:

1. Method for processing, in a container, a vegetable product containing a solid part suspended in a liquid part, comprising controlling a pressure of a gas in said container for modifying the specific weight of said solid part, so as to prevent said solid part from floating on said liquid part until drying, wherein said preventing is achieved by increasing said pressure of said gas in said container, said increasing said pressure causing said specific weight of said solid part to be increased to an extent that said solid part is completely immersed into said liquid part, wherein said increase in said specific weight is caused by a contraction of bubbles produced by said gas in said solid part, said contraction being obtained through said increasing said pressure, and wherein said preventing is achieved without having to break said solid part up.

2. Method according to claim 1, wherein said gas is generated by a chemical process that occurs in said vegetable product.

3. Method according to claim 2, wherein said chemical process comprises fermentation.

4. Method according to claim 1, wherein said gas comprises carbon dioxide.

5. Method according to claim 1, wherein said increasing said pressure is obtained substantially by closing said container, so as to enable said gas to accumulate in said container.

6. Method according to claim 1, wherein said controlling further comprises decreasing said pressure in said container when said pressure reaches a preset threshold value, so as to cause a reduction in said specific weight and enable said solid part to reascend to a surface zone of said liquid part.

7. Method according to claim 6, wherein said reduction of said specific weight is caused by a dilation of bubbles produced by said gas in said solid part, said dilation being obtained by means of said decreasing said pressure.

8. Method according to claim 6, wherein said threshold value is comprised between about 0.3 and 0.4 bar.

9. Method according to claims 6, wherein said decreasing said pressure is obtained by enabling said gas to escape from said container.

10. Method according to claim 9, wherein said escaping occurs through a pressure-limiting valve device.

11. Method according to claim 9, wherein said escaping is substantially obtained by opening a door element comprised in said container.

12. Method according to claim 1, wherein said modifying said specific weight of said solid part comprises increasing and decreasing said specific weight in a cyclical manner.

13. Method according to claim 12, wherein said increasing and decreasing said specific weight in a cyclical manner is obtained through a timing device driving a pressure-limiting valve device.

14. Method according to claim 12, wherein said increasing and decreasing said specific weight in a cyclical manner is obtained through a timing device driving a door element.

15. Method according to claim 1, wherein said vegetable product are grapes, said solid part comprising grape berries and said liquid part comprising must.

* * * * *